UNITED STATES PATENT OFFICE.

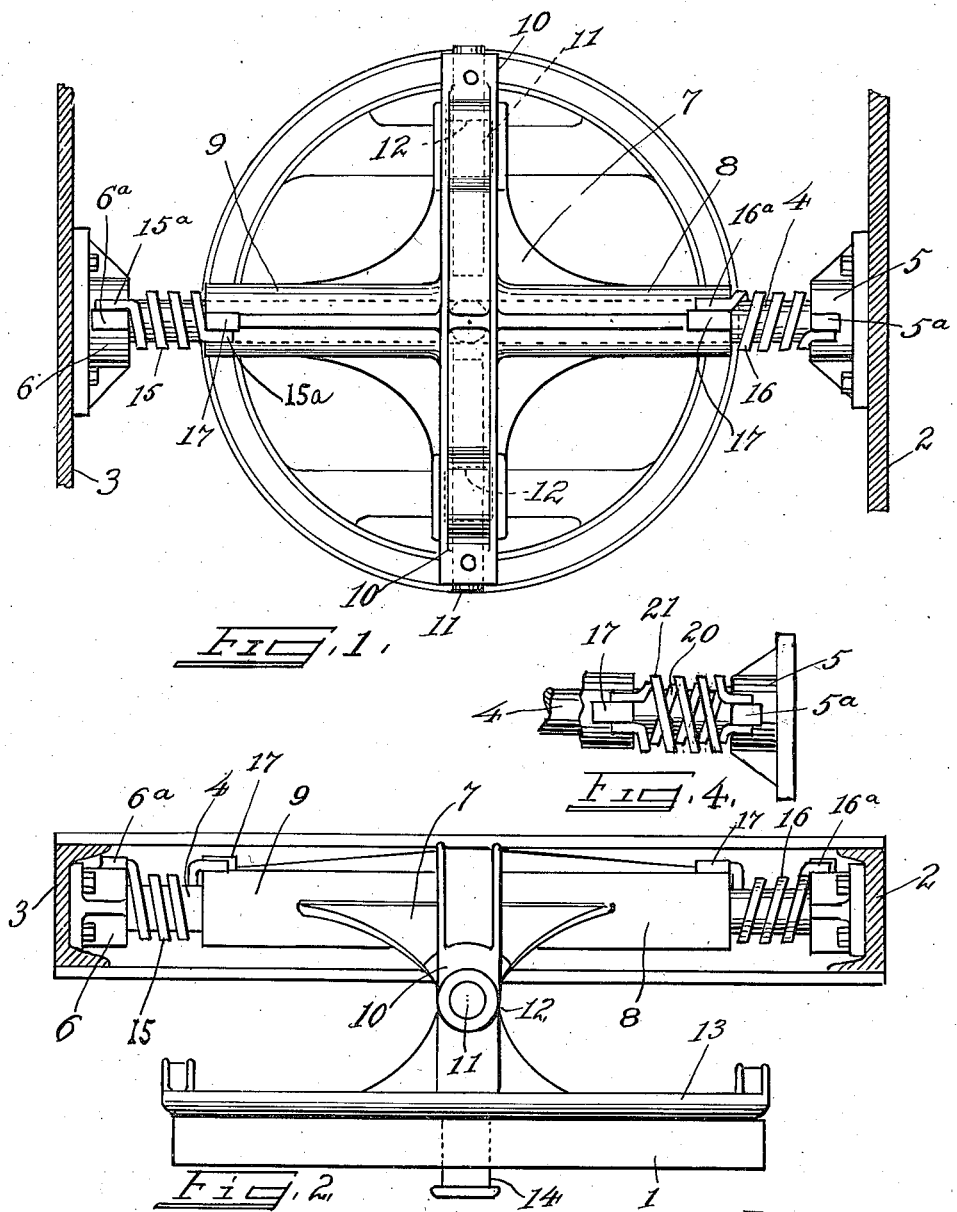

JAMES MORRISON, OF CINCINNATI, OHIO, ASSIGNOR TO THE TRAILMOBILE COMPANY, OF CINCINNATI, OHIO, A CORPORATION OF OHIO.

FIFTH-WHEEL DEVICE.

1,377,138.

Specification of Letters Patent.    Patented May 3, 1921.

Application filed December 20, 1919. Serial No. 346,331.

*To all whom it may concern:*

Be it known that I, JAMES MORRISON, a citizen of the United States, and a resident of the city of Cincinnati, in the county of Hamilton and State of Ohio, have invented certain new and useful Improvements in Fifth-Wheel Devices, of which the following is a full, clear, and exact description, reference being had to the accompanying drawings, forming a part of this specification.

My invention relates to fifth wheel devices, particularly for suspension from the trailer vehicle in a semi-trailer assembly, although its application to other uses will be obvious and it is desired to include all possible uses within the scope of the invention.

Semi-trailers are that type of vehicle wherein a tractor is employed to move a trailer, said trailer being supported at its forward end on the rear end of the tractor. A connection between the trailer and the tractor, to permit the proper relative movements of said two vehicles at the point of attachment, is the chief engineering difficulty that the structure involves.

It is the object of my invention to provide a full, rocking fifth wheel member for vehicles generally and semi-trailers in particular, wherein a sliding motion is also provided and spring means for taking up both sliding and rocking movement of the two vehicles with relation to each other.

This object and other advantages I accomplish by that certain construction and arrangement of parts to be hereinafter more specifically pointed out and claimed.

In the drawings,

Figure 1 is a top plan view of the fifth wheel device.

Fig. 2 is a side elevation thereof.

Fig. 3 is a perspective view of one of the springs.

Fig. 4 is a detail plan view of a modification.

No tractor or trailer vehicles are shown in the drawings as they may be of any desired type, and the fifth wheel for the tractor is merely illustrated diagrammatically at 1, (Fig. 2.)

The fifth wheel device is shown as connected with the front channel bar 2, of a trailer frame, and a cross bar 3, located to the rear of the front bar. Between these two bars is set a heavy rod or shaft 4, which is suitably held in socket members 5, 6, secured to the front and cross bars respectively.

The shaft 4 may be journaled in the sockets, if desired, but I prefer that it be rigidly held therein.

The spider 7 is provided, having longitudinal arms 8 and 9 and lateral arms 10, 10. Through the longitudinal arms is formed a sleeve which is journaled over the shaft 4. The cross arms are also hollow to receive stub shafts 11, 11, and intermediate the ends of said cross arms they are cut away to permit of the insertion for engagemnt by the stub shafts, of bosses 12, 12, formed on the fifth wheel plate proper.

This fifth wheel plate 13 is shown with a depending king pin member 14, for forming a pivotal connection with the tractor fifth wheel member 1.

The spider thus has a journaled movement permitting it to rock sidewise of the trailer, and the fifth wheel plate has a journaled movement permitting it to tip longitudinally of the trailer. In addition to this the spider has a sliding movement longitudinal of the trailer.

As formerly stated, it is desirable that spring means be employed to take up the shock of the longitudinal sliding of the fifth wheel device, and further spring means to take up the sidewise swaying of said device. According to my invention the same springs are employed to accomplish both purposes.

I provide a spiral spring 15 having its two ends bent outwardly at 15$^a$, 15$^a$, and turned in a left to right direction, and also like spring 16, having in a left to right direction, and also like the spring 15, having its ends turned upwardly and outwardly at 16$^a$, 16$^a$, and having a right to left turn.

The sockets 5 and 6 are formed with lugs 5$^a$, and 6$^a$ on their upper sides, and the longitudinal arms of the spider are formed with lugs 17, 17, same being placed so as to lie approximately in line with the lugs 5$^a$, and 6$^a$, when the spider is in a horizontal plane.

The springs are, preferably formed of wide bar metal, and made up with the wide dimension running longitudinally of the spring, whereby they are more powerful in resisting torsion than a longitudinal compression. They are set, one at each end of the spider, over the shaft 4, with their ends lying on opposite sides of the adjacent lugs, (Fig. 1).

As is evident, the forward or rearward longitudinal sliding of the spider will result in the springs being compressed and thus taking up the jar or shock. Upon rocking movement, the left hand swaying will be taken care of by one of the torsion springs, and the right hand swaying by the other.

Neither of the springs is held fast at either end and therefore will not be subject to fracture, as in a contrary instance.

In a modification of the above structure whereby there is torsion taken care of at each end of the spider, I provide for inner and outer springs at each end of the spider, one being a left hand and the other a right hand. Thus the inside spring 20 (Fig. 4) is a left to right, and the outside spring 21, is of greater diameter than the spring 20 and turned right to left.

Without illustrating a complete structure it will be evident that I may provide for each assembly, a small and a large of both the right hand springs, and the left hand springs, and mount two at each end of the spider. The spring ends will then lie on both sides of their respective lugs and any swaying motion will be taken up on both ends of the spider instead of one end, as in the structure first described.

It is not desired, as has been said, that the illustration of my invention as applied to semi-trailer fifth wheels be construed as a limitation of my invention to this specific use only, since there is a wide range of usefulness for fifth wheels, and I desire that my invention be used wherever it may in the future result in an advantageous improvement.

Neither do I wish to be limited in my claims that follow to the specific type of suspended fifth wheel plate, or the use of the springs, and journals for the upper member only, of a fifth wheel assembly.

Having thus described my invention, wnat I claim as new and desire to secure by Letters Patent is:—

1. A fifth wheel device comprising in combination with a vehicle frame, a plate, means on the vehicle frame for supporting said plate to permit a sliding and rocking relation between said plate and vehicle, and springs intermediate the plate and the frame, said plate and frame being adapted to engage said springs both for compression and torsion.

2. A fifth wheel device comprising in combination with a vehicle frame, a plate, a shaft on the vehicle frame, means for mounting the plate, slidably and rockingly on said shaft, and spiral springs over the shaft, between said plate and frame, and means on the plate and frame to engage the ends of said springs torsionally, for the purpose described.

3. A fifth wheel device comprising in combination with a vehicle frame, a plate, means on the vehicle frame for supporting said plate to permit a sliding and rocking relation between said plate and vehicle, and spiral springs intermediate the plate and the frame, said springs having their ends lying over the plate and frame, abutment means on said plate and frame to engage the ends of the springs, whereby a take up is provided for the rocking movement, and said springs positioned with their body portion intermediate the plate and frame, whereby the sliding motion is taken up.

4. A fifth wheel device comprising in combination with a frame of a vehicle, a plate, a mounting means therefor, to provide a rocking and sliding connection of the plate to the vehicle, and spring means lying intermediate the plate and the vehicle along the longitudinal axis of the vehicle, said springs comprising at each end of the mounting means, an inner spring and an outer spring, one of said springs of each assembly being left hand and the other right hand, and means for the frame and for the plate to engage the ends of both springs of each set for torsional and compression movement.

JAMES MORRISON.